United States Patent
Freebury et al.

(10) Patent No.: US 11,009,695 B2
(45) Date of Patent: May 18, 2021

(54) OCCULTER PETAL UNFURLING SYSTEM

(71) Applicant: TENDEG LLC, Louisville, CO (US)

(72) Inventors: Gregg E. Freebury, Louisville, CO (US); William H. Francis, Lyons, CO (US); Neal J Beidleman, Aspen, CO (US)

(73) Assignee: TENDEG LLC, Louisville, CO (US)

( * ) Notice: Subject to any disclaimer, the term of this patent is extended or adjusted under 35 U.S.C. 154(b) by 188 days.

(21) Appl. No.: 15/871,843

(22) Filed: Jan. 15, 2018

(65) Prior Publication Data

US 2018/0203225 A1 Jul. 19, 2018

Related U.S. Application Data

(60) Provisional application No. 62/447,127, filed on Jan. 17, 2017.

(51) Int. Cl.
| | |
|---|---|
| *G02B 26/02* | (2006.01) |
| *G02B 27/00* | (2006.01) |
| *B64G 1/22* | (2006.01) |
| *G02B 5/00* | (2006.01) |
| *H01Q 15/16* | (2006.01) |

(52) U.S. Cl.
CPC .......... *G02B 26/02* (2013.01); *B64G 1/222* (2013.01); *G02B 5/005* (2013.01); *G02B 27/00* (2013.01); *H01Q 15/161* (2013.01)

(58) Field of Classification Search
CPC ........ G02B 5/005; G02B 26/02; G02B 27/00; B64G 1/222; B64G 1/66; H01Q 15/161

USPC ............ 359/601, 612, 613; 244/158.1, 172.6
See application file for complete search history.

(56) References Cited

U.S. PATENT DOCUMENTS

| | | | | |
|---|---|---|---|---|
| 5,446,474 | A * | 8/1995 | Wade | H01Q 15/161 |
| | | | | 343/912 |
| 8,167,247 | B2 * | 5/2012 | Daily | G02B 26/02 |
| | | | | 244/172.6 |
| 8,356,774 | B1 * | 1/2013 | Banik | B64G 1/222 |
| | | | | 244/159.5 |
| 8,480,241 | B1 * | 7/2013 | Tenerelli | B64G 1/66 |
| | | | | 359/601 |
| 2013/0229709 | A1 * | 9/2013 | Newswander | H04B 10/118 |
| | | | | 359/399 |
| 2015/0146288 | A1 * | 5/2015 | Newswander | G02B 17/0808 |
| | | | | 359/399 |
| 2017/0254929 | A1 * | 9/2017 | Dailey | B64G 1/54 |

OTHER PUBLICATIONS

NASA Jet Propulsion Laboratory, "Flower Power Starshade Unfurls in Space," https://www.jpl.nasa.gov/video/details.php?id=1284. (Year: 2014).*
NASA Jet Propulsion Laboratory, "Flower Power Starshade Unfurls in Space," video. (Year: 2014).*
U.S. Appl. No. 62/447,127, filed Jan. 17, 2017.

* cited by examiner

*Primary Examiner* — Nicholas R. Pasko
(74) *Attorney, Agent, or Firm* — Craig R. Miles; CR Miles P.C.

(57) ABSTRACT

An occulter petal unfurling system including occulter petal unfurler disposed to rotate in relation to an occulter to unfurl a plurality of petals which in an unfurled condition can be used to block or suppress incoming light.

18 Claims, 13 Drawing Sheets

US 11,009,695 B2

OCCULTER PETAL UNFURLING SYSTEM

This United States Non-Provisional patent application claims the benefit of U.S. Provisional Patent Application No. 62/447,127, filed Jan. 17, 2017, hereby incorporated by reference herein.

I. GOVERNMENT LICENSE RIGHTS

This invention was made with government support under Contract Number NNX13CP27P awarded by NASA JPL SBIR Program Office. The government has certain rights in this invention.

II. SUMMARY OF INVENTION

A broad object of particular embodiments of the invention can be to provide an occulter petal unfurler which can be coupled to an occulter, the occulter petal unfurler including a spool, a carousel rotatable about the spool, and a plurality of elongate members coupled to said carousel radially outward of and in circumferentially spaced apart relation around a spool longitudinal axis to interleave between a plurality of occulter petals circumferentially furled about the occulter Another broad object of particular embodiments of the invention can be to provide a method in an occulter petal unfurler including obtaining a spool, rotatably coupling a carousel about the spool, and disposing a plurality of elongate members radially outward of and in circumferentially spaced apart relation around a spool longitudinal axis to interleave between a plurality of occulter petals circumferentially furled about the occulter.

Another broad object of the invention can be to provide a method in an occulter petal unfurling system including rotating a carousel about a spool of an occulter petal unfurler, the spool coupled to a hub of an occulter having a plurality of occulter petals, said carousel having a plurality of elongate members coupled to said carousel radially outward of and in circumferentially spaced apart relation around the hub of the occulter, the plurality of elongate members interleaved between the plurality of occulter petals furled about said hub, whereby rotation of said carousel about said spool causes said plurality of occulter petals to radially extend from said hub toward an unfurled condition.

III. BRIEF DESCRIPTION OF THE DRAWINGS

IV. DETAILED DESCRIPTION OF THE PREFERRED EMBODIMENTS

Figure 7:
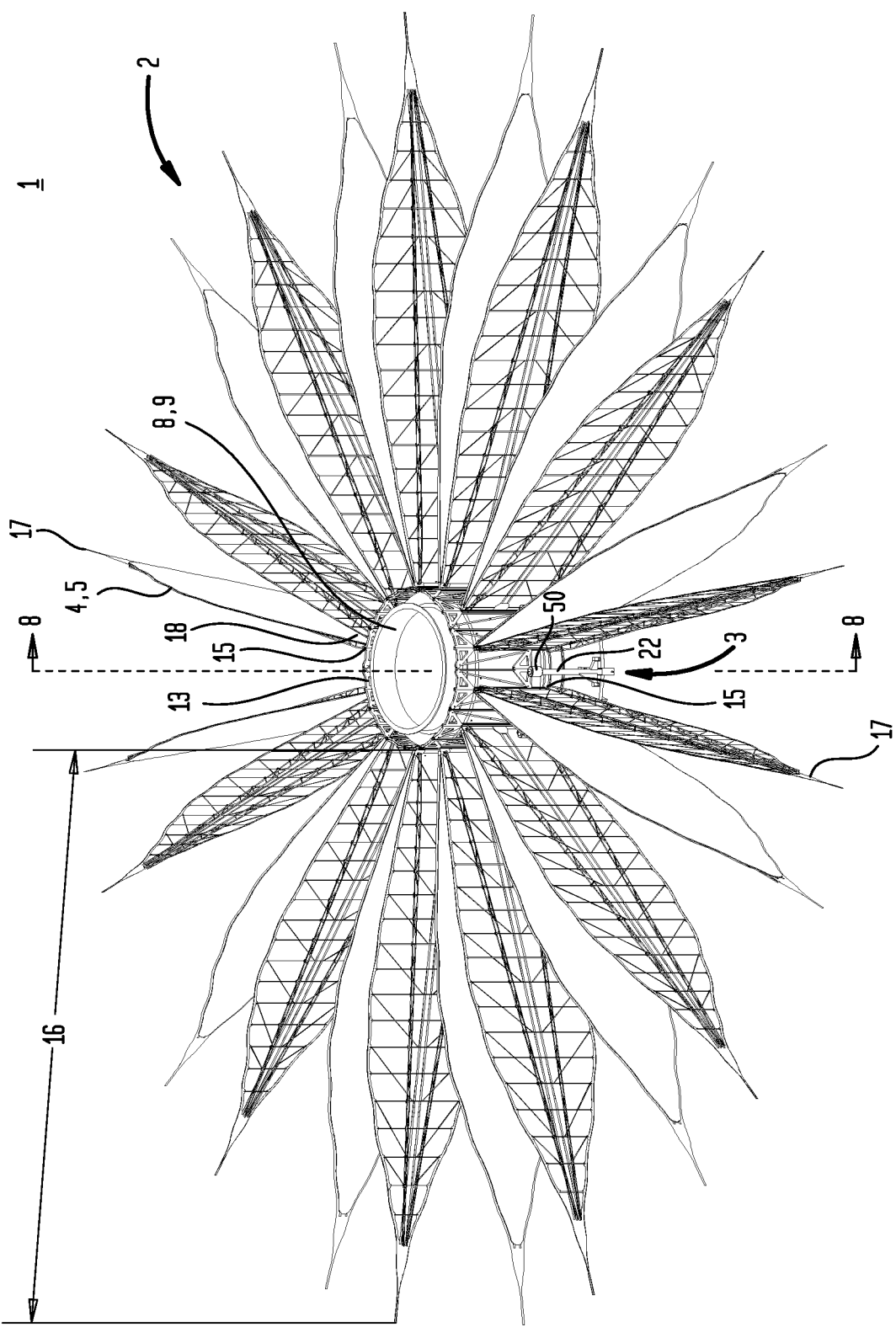
FIG. 7 is a top front elevation perspective view of a particular embodiment of an occulter petal unfurling system having a plurality of occulter petals disposed in a radially extended unfurled condition.
Figure 8:
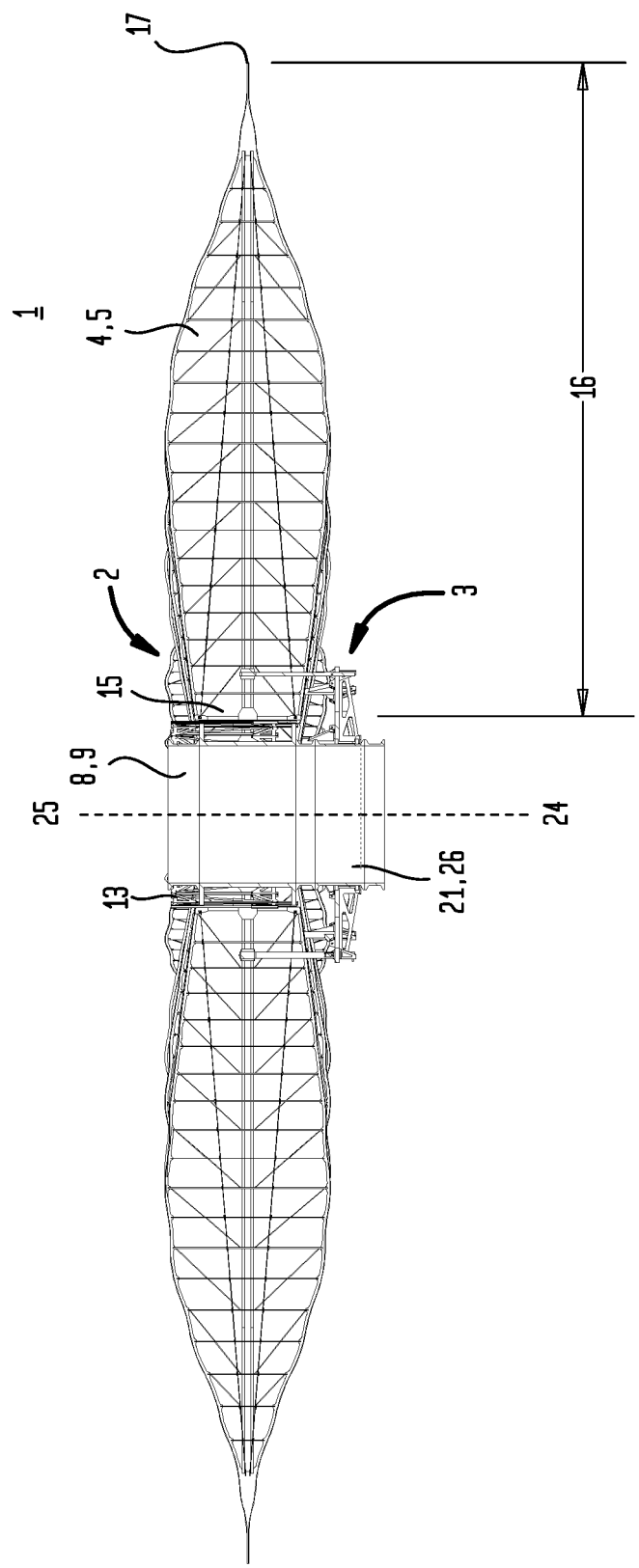
FIG. 8 is a cross section view 7-7 of the particular embodiment of the occulter petal unfurling system shown in FIG. 7.
Figure 9:
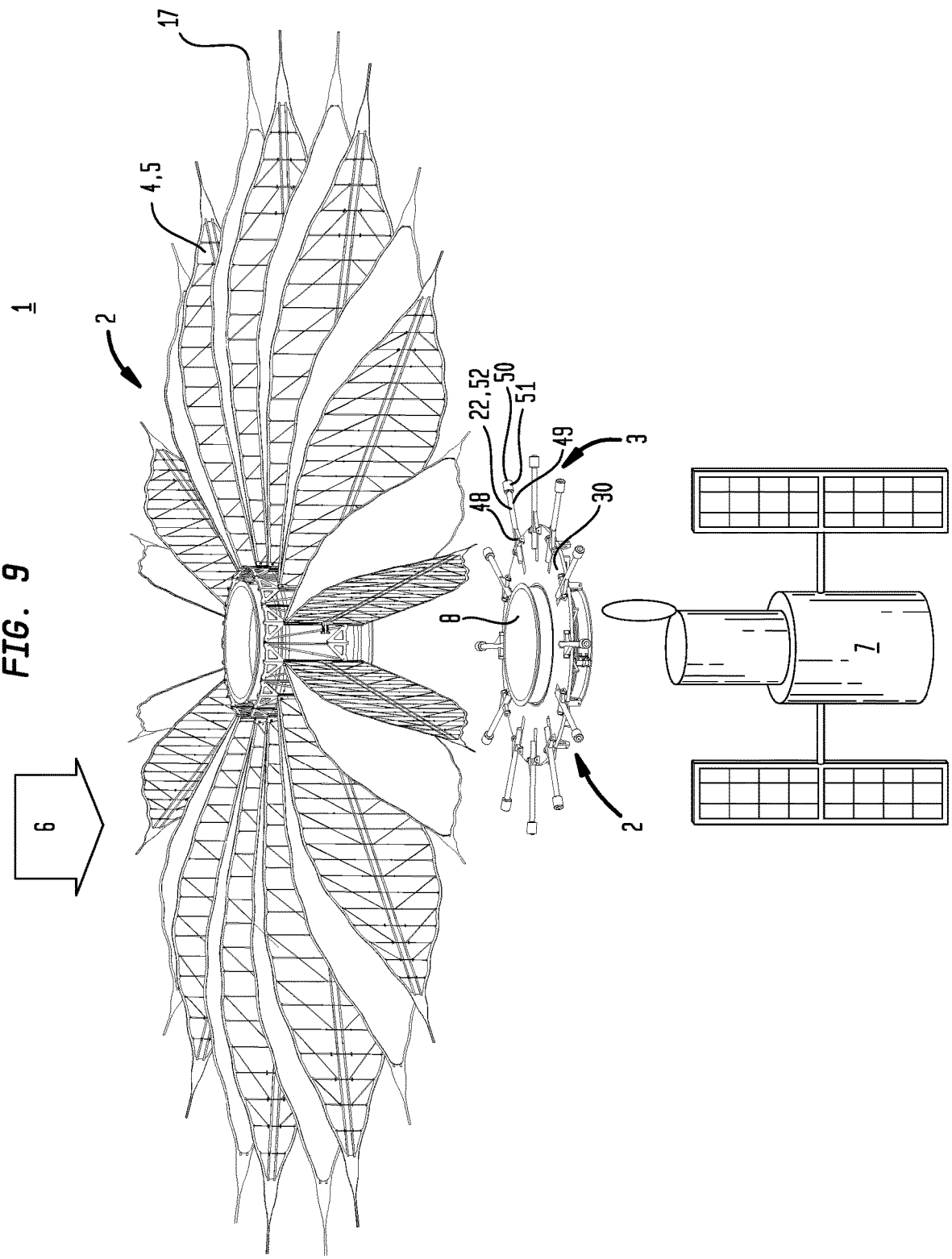
FIG. 9 is a top front elevation perspective view of a particular embodiment of the occulter petal unfurling system illustrating an occulter having a plurality of petals disposed in a radially extended unfurled condition and an occulter petal unfurler separated from the occulter.

Now referring generally to FIGS. 1 through 13, an occulter petal unfurling system (1) can include an occulter (2) and an occulter petal unfurler (3). The occulter petal unfurler (3) can be disposed to rotate in relation to the occulter (2) to unfurl a plurality of petals (4) which in an unfurled condition (5) (as shown in the example of FIGS. 7 through 9) can be used to block or suppress incoming light (6)) (as shown in the example of FIG. 9). As to particular embodiments, the occulter (2) can, but need not necessarily, be disposed in outer space a distance from a telescope (7) to block or suppress incoming light (6) to enable imaging of faint targets, such as suppressing incoming starlight to image Earth-like planets.

Figure 1:
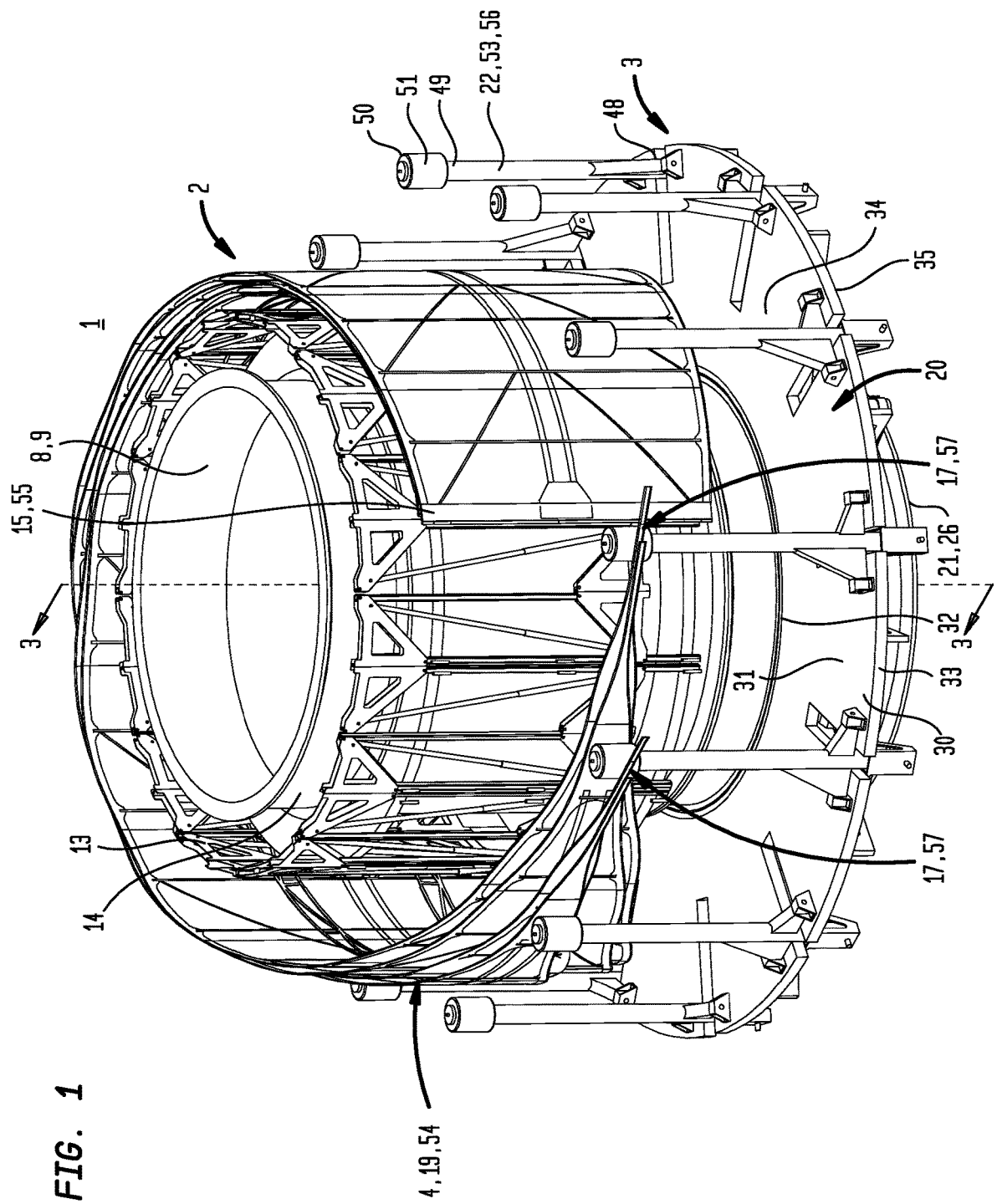
FIG. 1 is a partial top front elevation perspective view of a particular embodiment of an occulter petal unfurling system.
Figure 2:
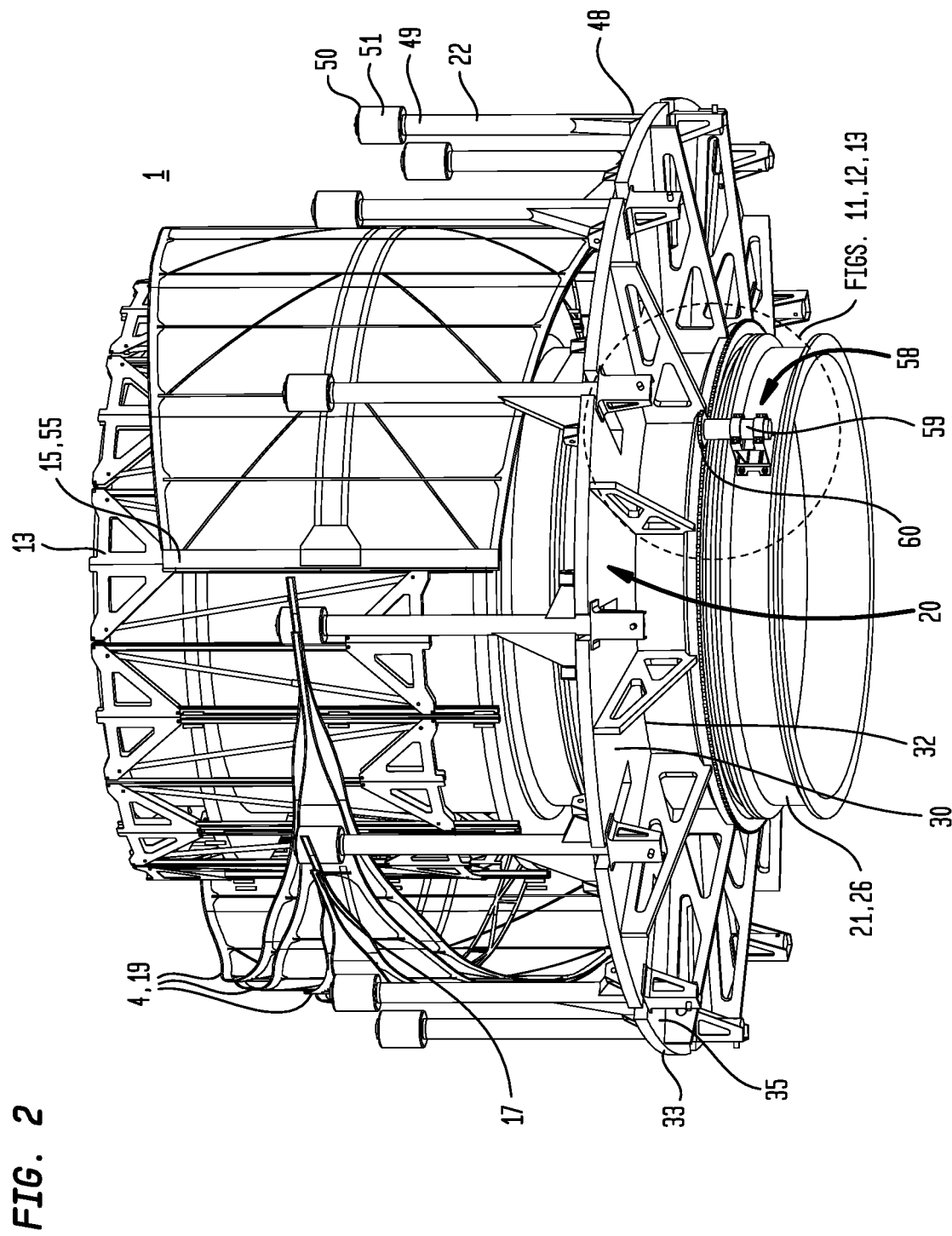
FIG. 2 is a partial bottom front elevation perspective view of the particular embodiment of the occulter petal unfurling system shown in FIG. 1.

Now referring primarily to FIGS. 1 through 6, the occulter (2) can include a hub (8). As shown in cross section FIG. 3, particular embodiments of the hub (8) can, but need not necessarily, be in the form of a hub hollow cylinder (9) having a hub cylinder length (10) disposed between hub first and second ends (11)(12). A perimeter truss (13) can be coupled about a hub external surface (14). As shown in the example of FIGS. 1 and 2, each of the plurality of occulter petals (4) can be coupled by a petal root (15) to the perimeter truss (13). In particular embodiments, the plurality of occulter petals (4) can number between 20 to 40 occulter petals (4) having a petal length (16) disposed between the petal root (15) and a petal tip (17) (as shown in the examples of FIGS. 7 and 8). In particular embodiments, the plurality of occulter petals can be selected from the group consisting of about 21 occulter petals to about 24 occulter petals, about 22 occulter petals to about 26 occulter petals, about 24 occulter petals to about 28 occulter petals, about 26 occulter petals to about 30 occulter petals, about 28 occulter petals to about 32 occulter petals, about 30 occulter petals to about 34 occulter petals, about 32 occulter petals to about 36 occulter petals, about 34 occulter petals to about 38 occulter petals, and about 36 occulter petals to about 39 occulter petals, or combinations thereof.

The petal length (16) can be between about 5 meters to about 20 meters; however, this illustrative example is not intended to preclude embodiments having a greater or lesser plurality of occulter petals (4) or a greater or lesser petal length (16). In particular embodiments, the petal length disposed between the petal root and the petal tip can be selected from the group consisting of: about 5.5 meters to about 6.5 meters, about 6.0 meters to about 7.0 meters, about 6.5 meters to about 7.5 meters, about 7.0 meters to about 8.0 meters, about 7.5 meters to about 8.5 meters, about 8.0 meters to about 9.0 meters, about 8.5 meters to about 9.5 meters, about 9.0 meters to about 10.0 meters, about 9.5 meters to about 10.5 meters, about 10.0 meters to about 11.0 meters, about 10.5 meters to about 11.5 meters, about 11.0 meters to about 12.0 meters, about 11.5 meters to about 12.5 meters, about 12.0 meters to about 13.0 meters, about 12.5 meters to about 13.5 meters, about 13.0 meters to about 14.0 meters, about 13.5 meters to about 14.5 meters, about 14.0 meters to about 15.0 meters, about 14.5 meters to about 15.5 meters, about 15.0 meters to about 16.0 meters, about 15.5 meters to about 16.5 meters, about 16.0 meters to about 17.0 meters, about 16.5 meters to about 17.5 meters, about 17.0 meters to about 18.0 meters, about 17.5 meters to about 18.5 meters, about 18.0 meters to about 19.0 meters, and about 18.5 meters to about 19.5 meters, or combinations thereof.

As to particular embodiments, two or more of the plurality of occulter petals (4) can be joined by the respective petal roots (15) adjacent one another or at a common location on the perimeter truss (13). As shown in the illustrative example of FIG. 6, twenty-four occulter petals (4) can comprise twelve pairs of petal roots (18) coupled to the perimeter truss (13) in circumferential spaced apart relation around the hub (8).

Figure 3:
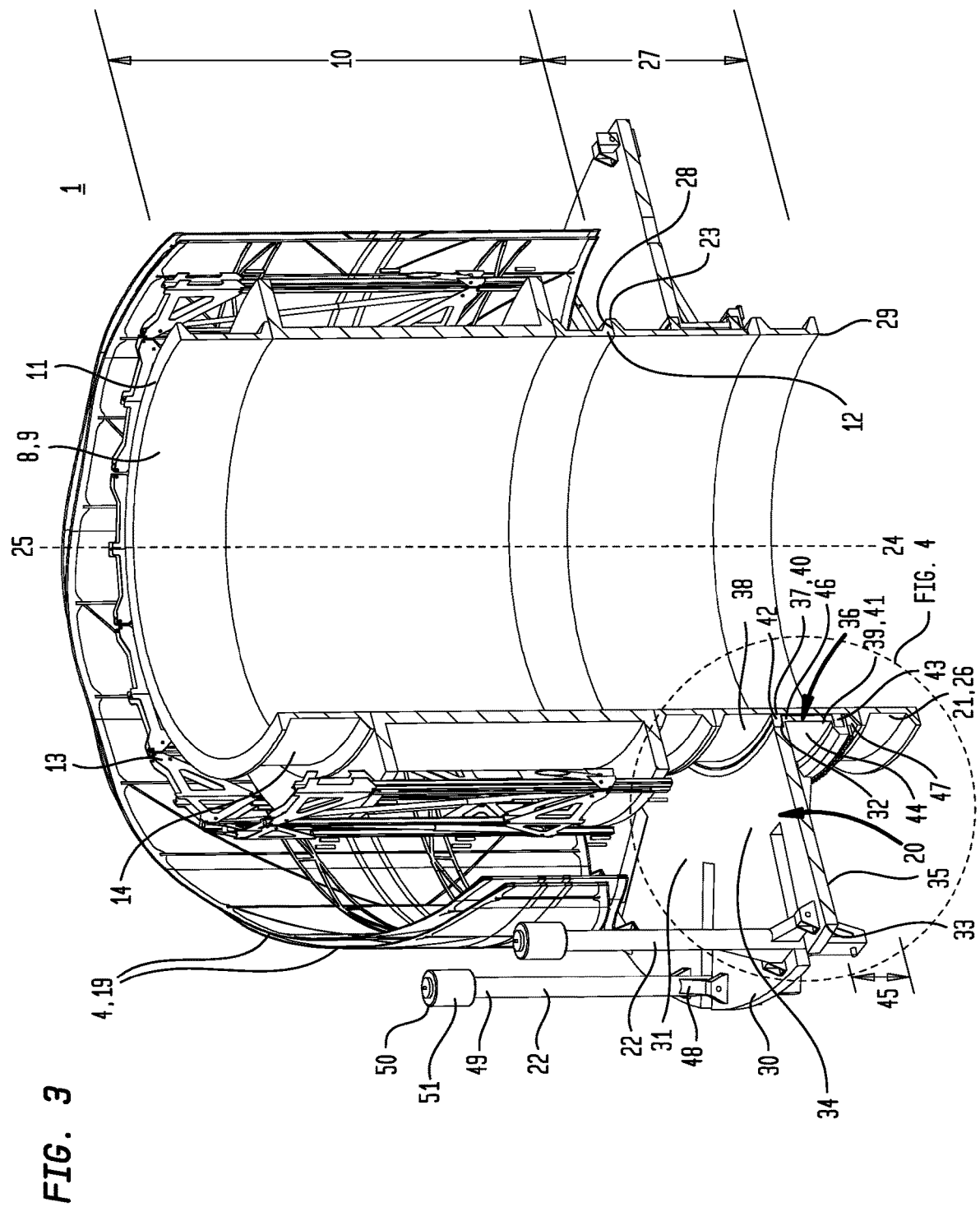
FIG. 3 is a cross section view 3-3 of the particular embodiment of the occulter petal unfurling system shown in FIG. 1.
Figure 4:
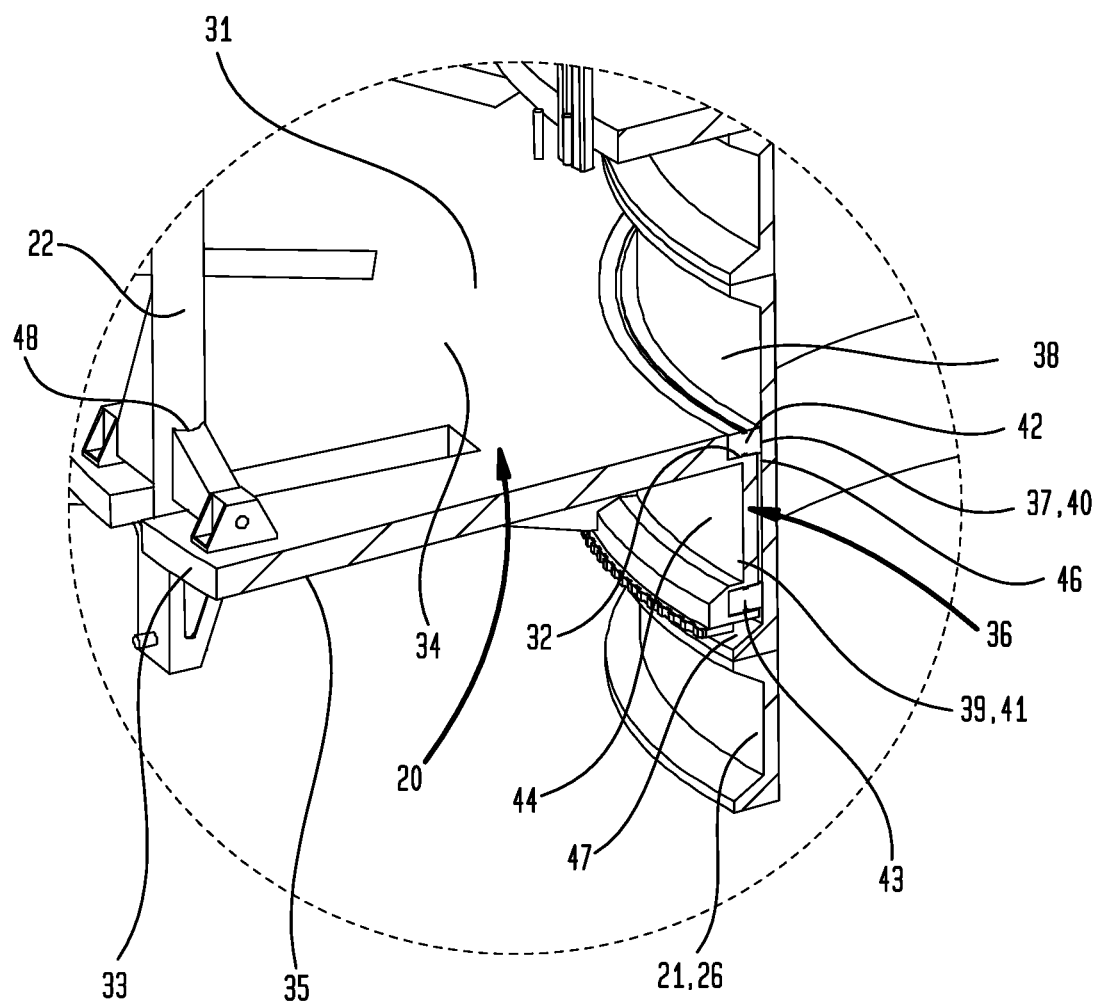
FIG. 4 is an enlarged portion of cross section 3-3 as shown in FIG. 3.
Figure 5:
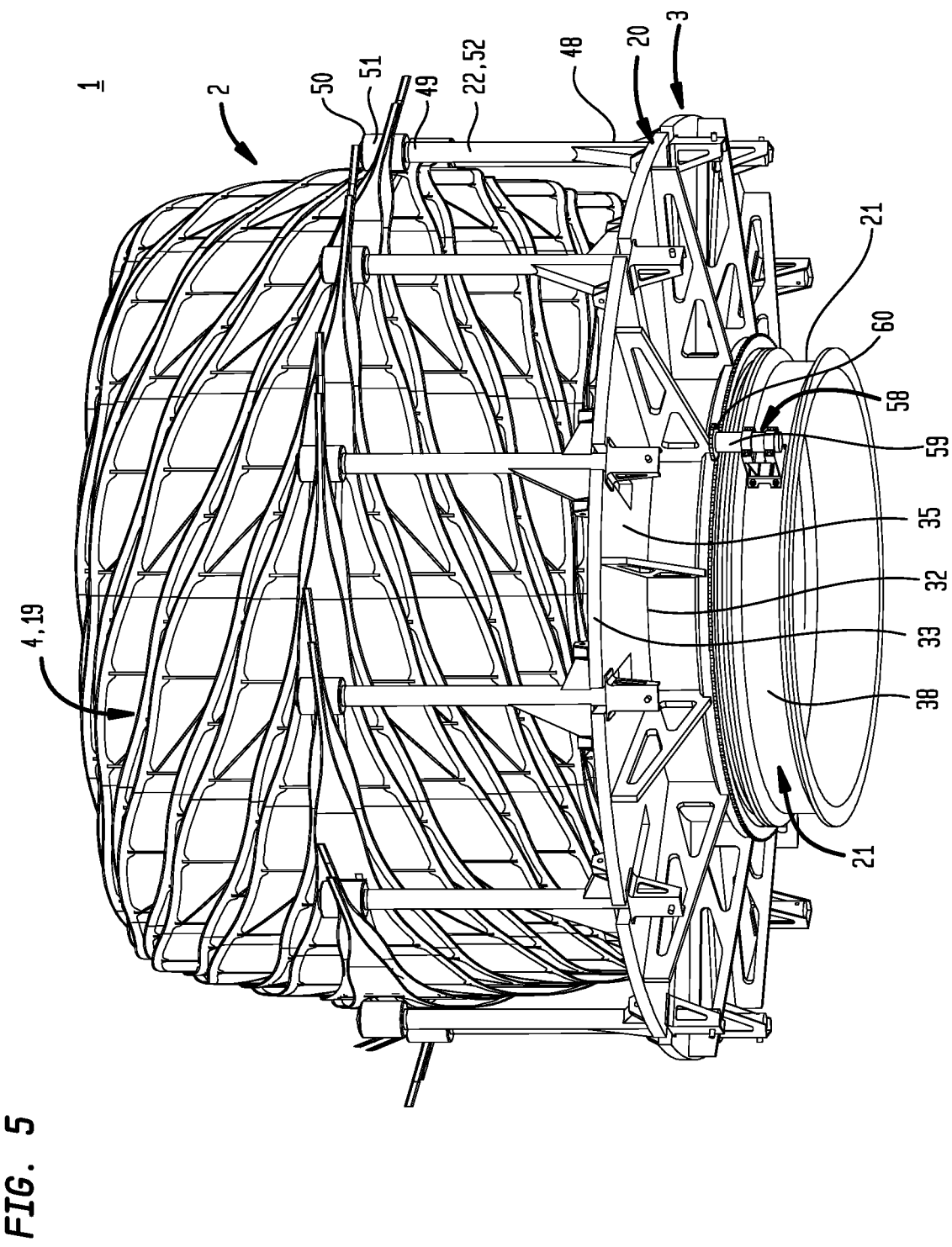
FIG. 5 is a complete bottom front elevation perspective view of the particular embodiment of the occulter petal unfurling system shown in FIG. 1 having a plurality of occulter petals wound in the furled condition.
Figure 6:
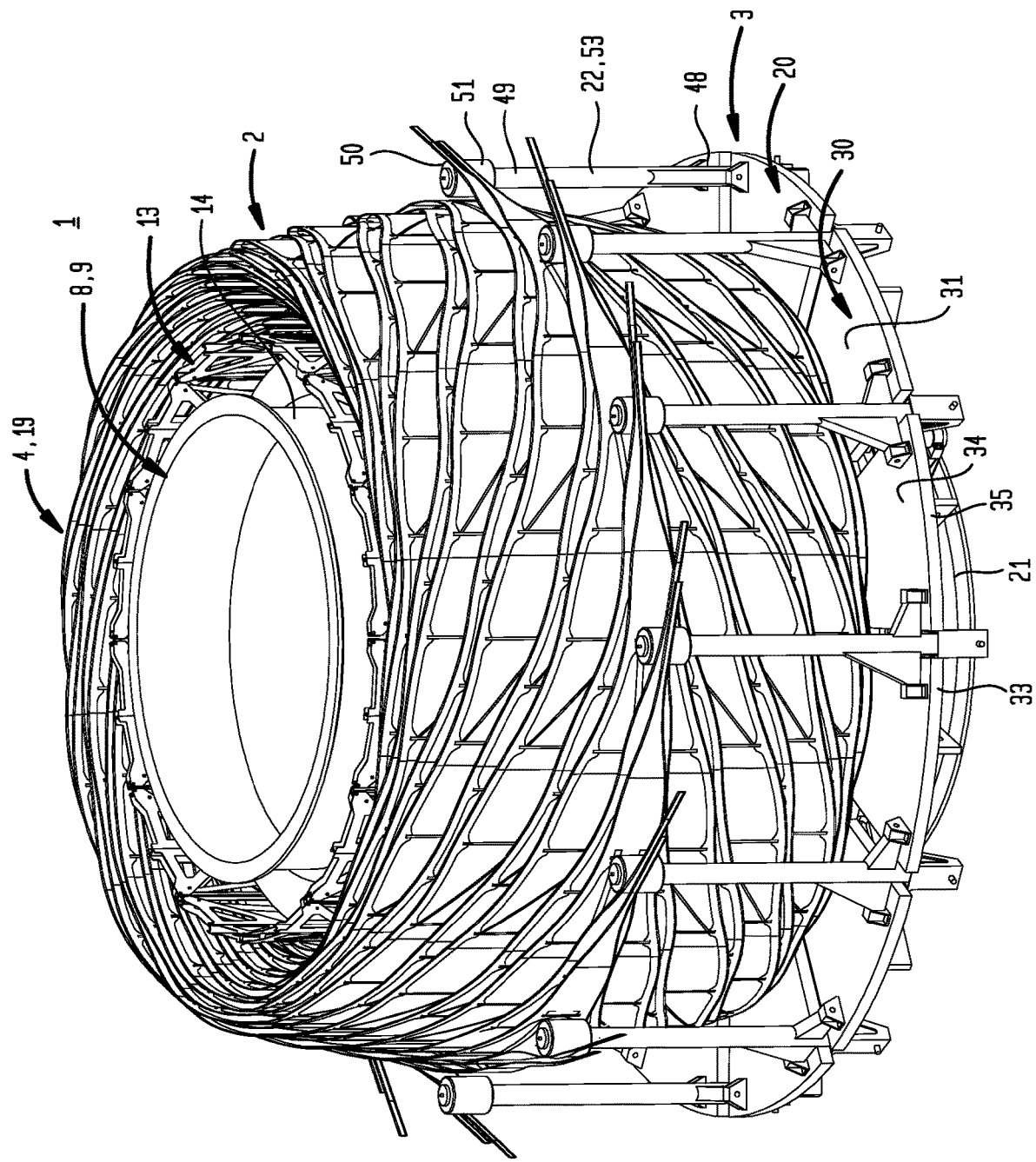
FIG. 6 is a complete top front elevation perspective view of the particular embodiment of occulter petal unfurling system shown in FIG. 1 having a plurality of occulter petals wound in the furled condition.

Again, referring primarily to FIGS. 1 through 6, the plurality of occulter petals (4) each having the petal root (15) joined to the perimeter truss (13) can be wound about the perimeter truss (13) to dispose the plurality of occulter petals (4) in a furled condition (19) (as shown in the example of FIGS. 5 and 6). For purposes of clarity, FIGS. 1 through 3 show two pairs of the plurality of occulter petals (4) wound about the perimeter truss (13) of the occulter (2). The plurality of occulter petals (4) can unwind or unfurl toward a radially extended unfurled condition (5) (as shown in FIGS. 7 through 10). The plurality of occulter petals (4) must move from the furled condition (19) to the unfurled condition (5) without forcing the plurality of petals (4) into an unwanted trajectory that could cause petal-to-petal interferences or result in damage to the thin optical petal edge typically having a thickness of between about 25 micrometers ("µm") to about 50 µm.

Now referring generally to FIGS. 1 through 13, the occulter petal unfurler (3) operates to unfurl a plurality of occulter petals (4) of an occulter (2) from the furled condition (5) toward the unfurled condition (19). The occulter petal unfurler (3) can include one or more of: a carousel (20) rotatable about a spool (21) and a plurality of elongate members (22) coupled to the carousel (20) radially outward of and in circumferentially spaced apart relation about the spool longitudinal axis (24). The spool (21) can be configured to couple or removably couple to the occulter (2) at a juncture plane (23) (as shown in the example of FIG. 3) such that a spool longitudinal axis (24) aligns or substantially aligns with a hub longitudinal axis (25). Referring primarily to FIG. 3, embodiments of the spool (21) can be configured as a spool hollow cylinder (26) having a spool cylinder length (27) disposed between spool cylinder first and second ends (28)(29). As to particular embodiments, the hub (8) and the spool (21) can have dimensions that allow the hub second end (12) to matingly join or removably matingly join the spool first end (28) at the juncture plane (23).

Now referring primarily to FIGS. 1 through 6, embodiments of the carousel (20) can include an annular member (30) having a central annular portion (31) extending between an annular member inner edge (32) and an annular member outer edge (33). While the Figures show an annular member outer edge (33) of generally circular configuration: this is not intended to preclude embodiments which include an annular member outer edge (33) having other configurations, such as a polygon (triangle, rectangle, square, pentagonal, hexagonal, heptagonal, octagonal, or the like), ellipse, oval, or the like. Similarly, while the Figures show a substantially continuous unbroken planate (generally flat) carousel top and bottom surfaces (34)(35) attendant the central annular portion (31), this illustrative embodiment is not intended to preclude embodiments in which the carousel top and bottom surfaces (34)(35) of the central annular portion (31) are not flat or continuous but rather uneven, curved, or perforated. As to particular embodiments of the carousel, the central annular portion (31) can, but need not necessarily, comprise a plurality of radial members extending from the annular member inner edge (32) configured to support one or more of the plurality of elongate members (22). In the particular embodiment shown in the Figures, the annular member (30) includes a central annular portion (31) having a substantially continuous planar top and bottom surfaces (34)(35) extending between the annular member inner edge (32) and the annular member outer edge (33).

Now referring primarily to FIGS. 3 and 4, the carousel (20) can be rotatably joined to the spool (21) by a journaled bearing assembly (36). The journaled bearing assembly (36) can include a first bearing component (37) circumferentially coupled about the spool external surface (38) and a second bearing component (39) coupled to the annular member inner edge (32). At least a portion of the first bearing component (37) has an inner annular journaled surface (40) and at least a portion of a second bearing component (39) has an outer annular journaled surface (41). The portion of the first bearing component (37) having the inner annular journaled surface (40) and the portion of a second bearing component (39) having an outer annular journaled surface (41) rotatably engage to allow the carousel (20) to rotate around the spool (21). The term "bearing" refers to an area of contact between surfaces. The first and second bearing components (37)(39) can, but need not necessarily, contact each other by way of roller elements.

As shown in the example of FIGS. 3 and 4, the first bearing component (37) can, but need not necessarily, have the inner annular journaled surface (40) configured as a pair of annular ribs (42)(43) circumferentially coupled in substantially parallel outwardly extending relation about the spool external surface (38). The second bearing component (37) can have the outer annular journaled surface (41) configured as an annular flange (44) having an annular flange height (45) disposed between an annular flange first edge (46) and an annular flange second edge (47). The annular flange (42) can be rotatingly disposed about the spool (21) between the pair of annular ribs (42)(43). The annular member inner edge (32) can be coupled to either or both of the annular flange first edge (46) or the annular flange second edge (47), whereby rotation of the annular flange (44) about the spool external surface (38) correspondingly rotates the annular member (30) about the spool longitudinal axis (24).

Now referring primarily to FIGS. 1 through 6, embodiments of the carousel (20) can further include a plurality of elongate members (22) having an elongate member length disposed between an elongate member first end (48) and an elongate member second end (49). The elongate member first end (48) can be coupled to the carousel (20) radially outward of and in circumferentially spaced apart relation about the spool longitudinal axis (24). As to particular embodiments, the plurality of elongate members (22) can, but need not necessarily, be disposed on a corresponding plurality of radii extending from the spool longitudinal axis (24) and spaced substantially equidistant from the spool longitudinal axis (24), and can, but need not necessarily, be spaced substantially equidistant apart circumferentially about the spool longitudinal axis (24). Each of the plurality of elongate members (22) can extend from the annular member (30) to interleave with the plurality of occulter petals (4). Particular embodiments can, but need not necessarily, further include a roller element (50) rotatably engaged to the elongate member (22). The roller element (50) can be positioned on the elongate member (22) to engage a roller perimetrical face (51) with a corresponding one or more of the plurality of occulter petals (4). As shown in the example of FIGS. 1 through 6, the roller element (50) can be coupled to the elongate member second end (49).

Figure 10:
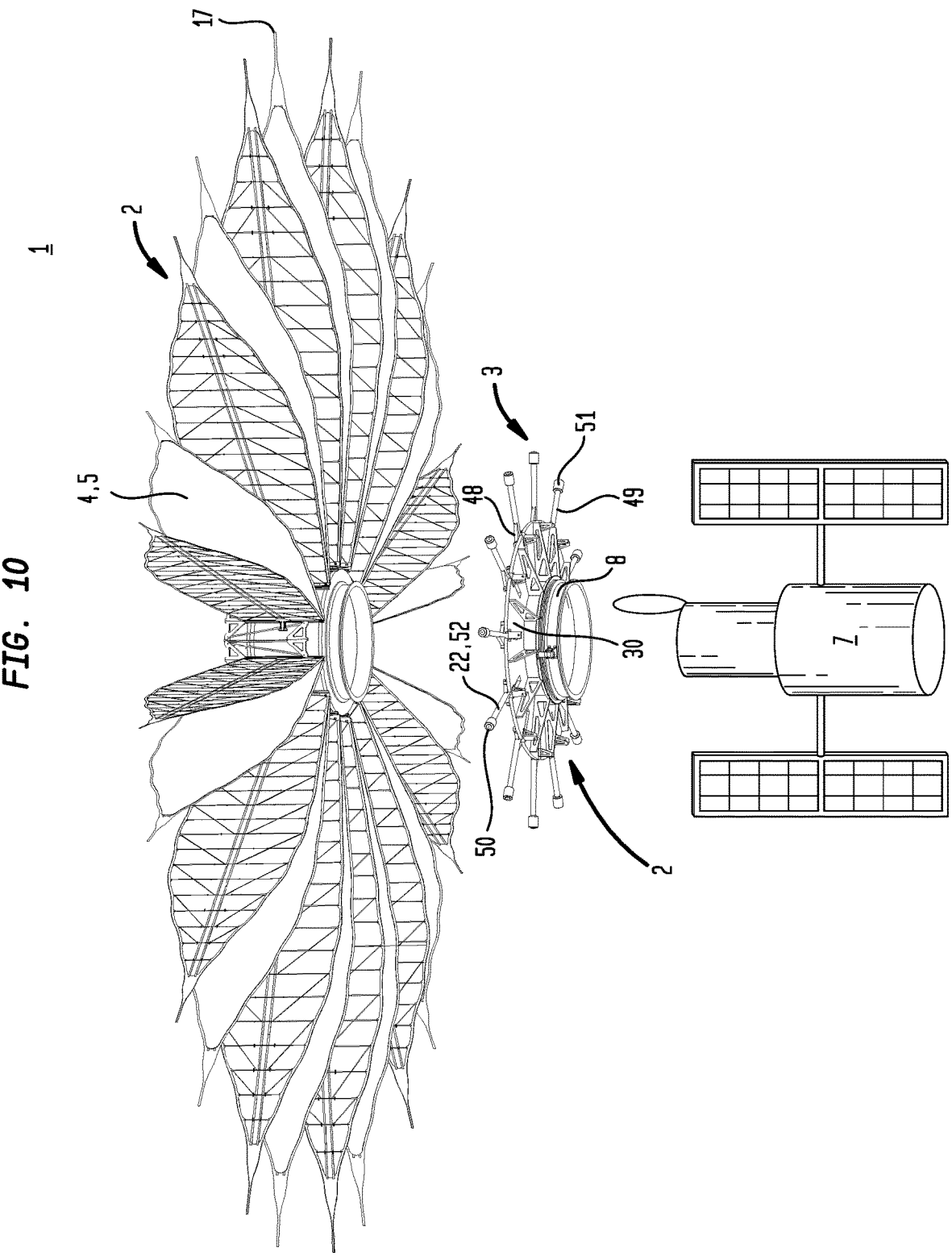
FIG. 10 is a bottom front elevation perspective view of a particular embodiment of the occulter petal unfurling system illustrating an occulter having a plurality of petals disposed in a radially extended unfurled condition and an occulter petal unfurler separated from the occulter.

As to particular embodiments, each of the elongate members (22) can, but need not necessarily, be coupled in fixed generally orthogonal relation to the annular member (30) (as shown in the example of FIG. 1). As to particular embodiments, the elongate members (22) can, but need not necessarily, be rotatably coupled to the annular member (30). Each of the elongate members (22) can rotate from a first position (52) extending radially outward of the annular member (30) (as shown in the example of FIGS. 9 and 10) toward a second position (53) orthogonal to the annular member (30) (shown in the example of FIGS. 1 through 5) or from the second position (53) toward the first position (52). As to particular embodiments, one or more of the plurality of elongate members (22) can, but need not necessarily, be responsive to an elastic element or springing element coupled proximate the elongate member first end (48) to generate rotation between the second position (53) toward the first position (52). As to particular embodiments, the plurality of elongate members (22) can, but need not necessarily, radially travel toward the spool (21) as the plurality of occulter petals (4) unwind from about the spool (21) toward the unfurled condition (5). As to particular embodiments, one or more of the plurality of elongate members (22) can, but need not necessarily, be responsive to an elastic element or springing element coupled proximate the elongate member first end (48) to generate radial travel toward the spool (21) as the plurality of occulter petals (4) unwind from about the spool (21) toward the unfurled condition (5).

Now referring primarily to FIGS. 1 through 6, a particular example of the occulter (2) includes twelve pairs of occulter petals (54) having a corresponding twelve pairs of petal roots (55), each pair coupled or joined in adjacent relation to the perimeter truss (13). The twelve pairs of petal roots (55) can be coupled in substantially equidistant spaced apart relation about the perimeter truss (13). As shown in the example of FIGS. 1 and 2, the circumferential distance between each of the twelve pairs of petal roots (55) can, but need not necessarily, be bisected by a radius extending from the spool longitudinal axis (24) to the location at which one of a corresponding twelve elongate members (56) couples in orthogonal relation, or has a second position (53) orthogonal to, the annular member (30). The twelve pairs of occulter petals (54) can be circumferentially wound in counter clockwise rotation about the perimeter truss (13) to position one pair of petal tips (57) between each adjacent pair of the twelve elongate members (56). The carousel (20) can be rotated clockwise about the spool (21) to unfurl the twelve pairs of occulter petals (54), which in the unfurled condition (5) (as shown in the example of FIGS. 7 through 10) can be used to block or suppress incoming light (6). However, the description of this particular embodiment is not intended to preclude embodiments having a greater or lesser number of occulter petals, pairs of occulter petals, or a greater or lesser number of elongate members which may interleave one or more than one occulter petals, or having the occulter petal roots coupled to the perimeter truss individually, whether or not in equidistant circumferentially spaced apart relation or unequidistant circumferential spaced apart relation.

Figure 11:
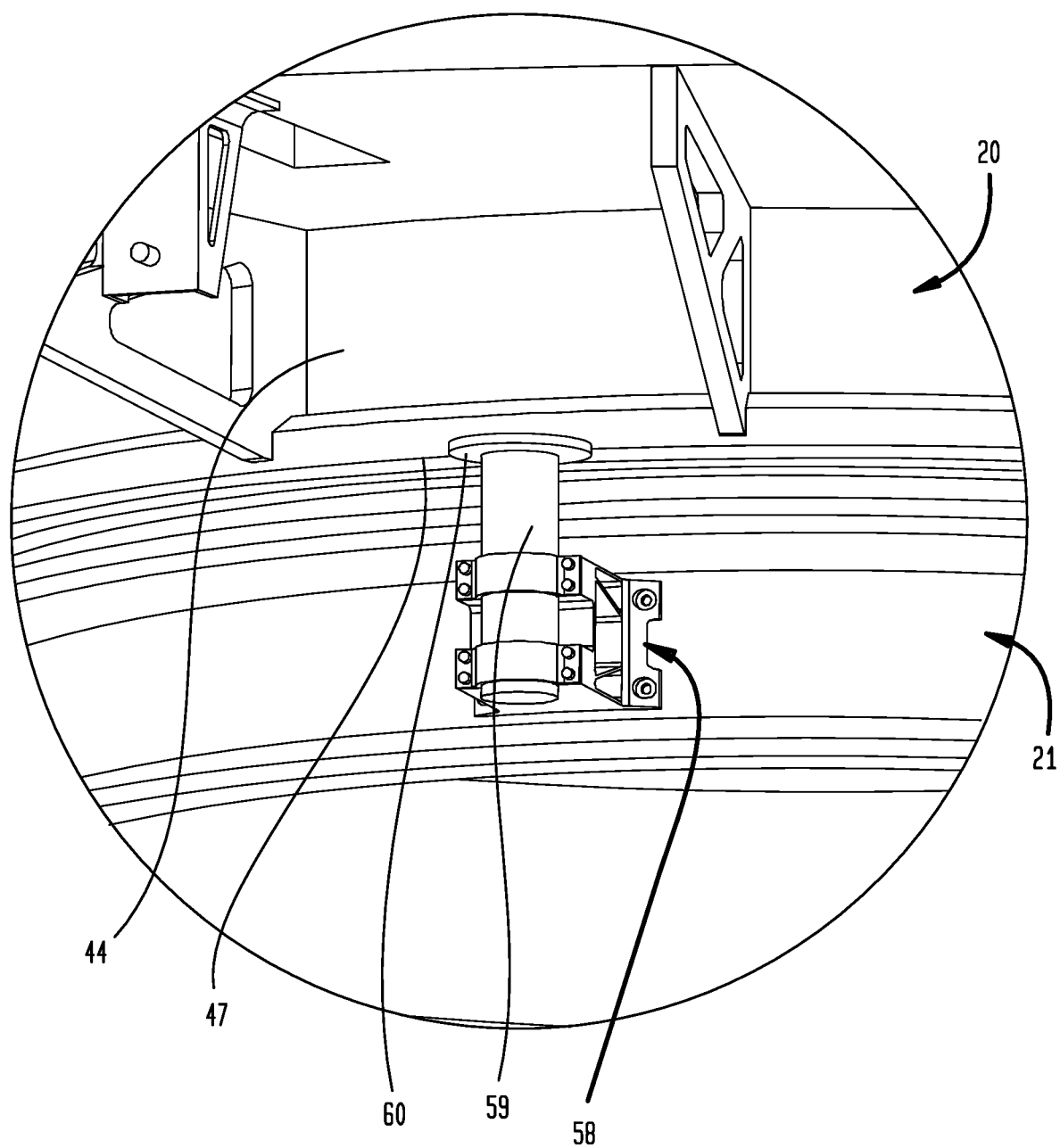
FIG. 11 is an enlarged portion of FIG. 2 illustrating a particular embodiment of a carousel drive assembly having a carousel drive element which engages a carousel to rotate the carousel around the spool of the occulter petal unfurler.
Figure 12:
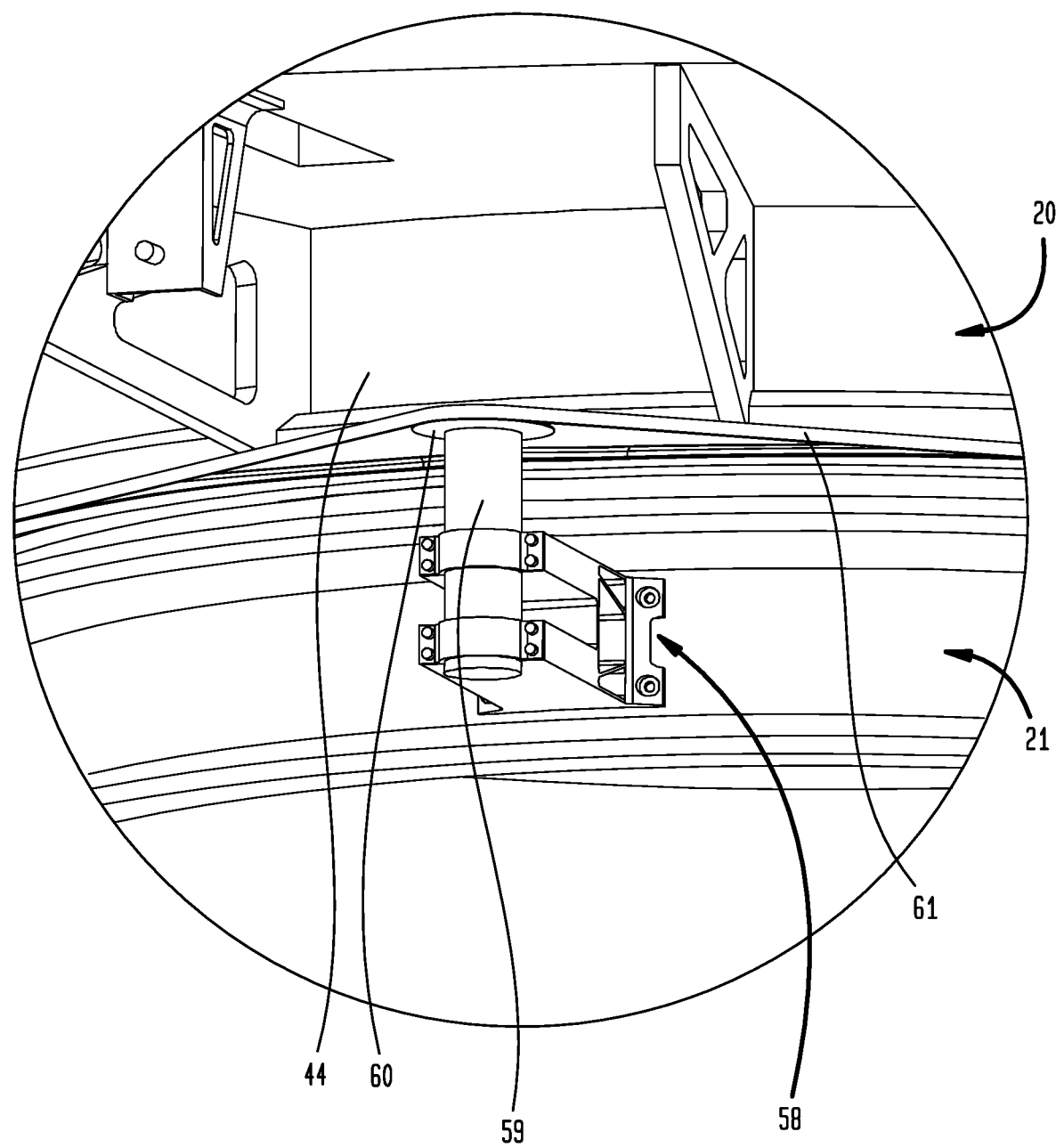
FIG. 12 is an enlarged portion of FIG. 2 illustrating a particular embodiment of a carousel drive assembly having a carousel drive element which moves a circuitous member to rotate the carousel around the spool of the occulter petal unfurler.
Figure 13:
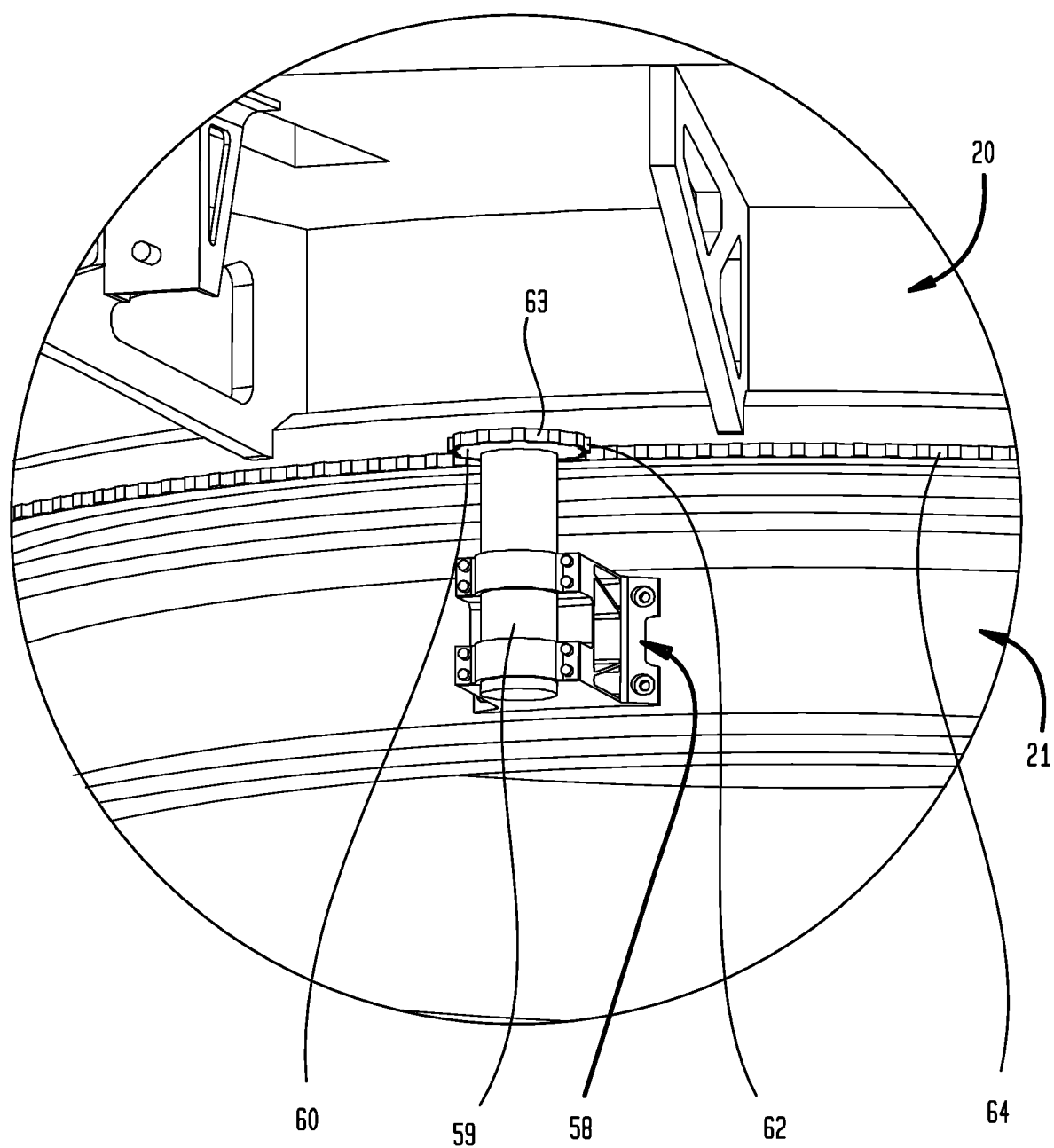
FIG. 13 is an enlarged portion of FIG. 2 illustrating a particular embodiment of a carousel drive assembly having a carousel drive element in toothed engagement with a carousel to rotate the carousel around the spool of the occulter petal unfurler.

Now referring primarily to FIGS. 2, 5, and 11 through 13, embodiments can further include a carousel drive assembly (58) operable to rotate the carousel (20) around the spool (21). As to particular embodiments, a drive motor (59) can be coupled or fixedly coupled at a location on the spool (21). The drive motor (59) can operate to rotate a carousel drive element (60) engagable or engaged with the carousel (20) which upon operation correspondingly rotates the carousel (20) in the clockwise direction to unfurl the plurality of occulter petals (4) wound about the perimeter truss (13) in a counter clockwise direction (or as to embodiments in which the plurality of occulter petals (4) are wound in the clockwise direction about the perimeter truss (13), the counter clockwise direction). As to particular embodiments, the carousel drive element (60) can frictionally engage the annular member (30) (as shown in the example of FIG. 11). As to these embodiments, including an annular flange (44), the carousel drive element (60) can frictionally engage the annular flange (44) proximate the annular flange second edge (47). As to other embodiments, a movable circuitous member (61) (such as a drive belt) can be entrained about the annular flange (44) and the carousel drive element (60) such that rotation of the carousel drive element (60) moves the circuitous member (61) in continuous path about the annular flange (44) to correspondingly rotate the carousel (20) (as shown in the example of FIG. 12). As to other embodiments, as shown in the example of FIG. 13, a first plurality of teeth (62) can be coupled in spaced apart relation about a perimetrical face (63) of the carousel drive element (60). A second plurality of teeth (64) can be coupled in circumferential spaced apart relation about the annular flange (44). The first and second plurality of teeth (62)(64) can be configured to intermesh, whereby rotation of the carousel drive element (60) correspondingly causes rotation of the annular flange (44) about the spool (21) which correspondingly rotates the carousel (20).

Now referring primarily to FIGS. 9 and 10, as to particular embodiments, upon achieving the unfurled condition (5) of the plurality of occulter petals (4), the occulter petal unfurler (3) can separate or be jettisoned from the occulter (2). As to the particular embodiment shown in FIGS. 8 and 9, the plurality of elongate members (22) can be rotatingly disposed in the second position (53) generally orthogonal to the annular member (30) and interleaved with the plurality of occulter petals (4) or plurality of pairs of occulter petals (54) wound counter clockwise (or clockwise) about the perimeter truss (13) (as shown in the examples of FIGS. 4 and 5). The carousel (20) can be rotated clockwise (or counter clockwise) about the spool (21) to dispose the plurality of occulter petals (5) or pairs of occulter petals (54) in the unfurled condition (5). Each of the plurality of elongate members (22) can then travel to the first position (52) outwardly radially extending from the annular member (30). The occulter petal unfurler (3) can then separate at the juncture plane (23) between the occulter hub (8) and the spool (21) allowing the occulter petal unfurler (3) to separate from the occulter (2).

As can be easily understood from the foregoing, the basic concepts of the present invention may be embodied in a variety of ways. The invention involves numerous and varied embodiments of an occulter petal unfurler (3) and methods for making and using such occulter petal unfurler (3) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "unfurler" should be understood to encompass disclosure of the act of "unfurling"—whether explicitly discussed or not—and, conversely, were there effectively disclosure of the act of "unfurling", such a disclosure should be understood to encompass disclosure of an "unfurler" and even a "means for unfurling." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the mountable carriers herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An occulter petal unfurler, comprising:
a hub having a hub external surface extending between a hub first end and a hub second end;
a plurality of occulter petals each having a petal length disposed between a petal tip and a petal root, said petal roots coupled in circumferential spaced apart relation to said hub, said plurality of occulter petals circumferentially furled about said hub;
a spool having a cylindrical external surface disposed between a spool first end and a spool second end, said spool first end configured to removably couple to said hub second end;
a carousel including an annular member having a central annular portion extending between an annular member outer edge and an annular member inner edge, wherein said annular member inner edge circumferentially engages and rotates about said cylindrical external surface of said spool; and
a plurality of elongate members each having an elongate member length disposed between first and second elongate member ends, said elongate member second ends coupled to said annular member radially outward of and in circumferentially spaced apart relation around a spool longitudinal axis, said plurality of elongate members extending in generally orthogonal relation to said annular member to dispose said plurality of elongate members interleaved between corresponding said plurality of occulter petals circumferentially furled about said hub, whereby rotation of said carousel about said spool causes said plurality of occulter petals to unfurl to radially extend from said hub.

2. The occulter petal unfurler of claim 1, wherein said second ends of said plurality of elongate members rotatably coupled to said annular member, each of said plurality of elongate members rotate from said generally orthogonal relation to said annular member to extending radially outward of said annular member.

3. The occulter petal unfurler of claim 1, further comprising a roller element which rotates about an elongate member longitudinal axis about said elongate member first end.

4. The occulter petal unfurler of claim 1, further comprising a plurality of radial slots disposed in said annular member, wherein said plurality of elongate members radially travel in said plurality of slots toward said spool as said plurality of occulter petals unfurl from about said spool toward said unfurled condition.

5. The occulter petal unfurler of claim 1, further comprising a perimeter truss circumferentially disposed about said hub external surface.

6. The occulter petal unfurler of claim 5, wherein two or more of said plurality of petal roots disposed adjacently on said perimeter truss.

7. The occulter petal unfurler of claim 1, wherein said plurality of occulter petals comprise 20 occulter petals to 40 occulter petals.

8. The occulter petal unfurler of claim 7, wherein said plurality of occulter petals is selected from the group consisting of: 21 occulter petals to 24 occulter petals, 22 occulter petals to 26 occulter petals, 24 occulter petals to 28 occulter petals, 26 occulter petals to 30 occulter petals, 28 occulter petals to 32 occulter petals, 30 occulter petals to 34 occulter petals, 32 occulter petals to 36 occulter petals, 34 occulter petals to 38 occulter petals, and 36 occulter petals to 39 occulter petals, or combinations thereof.

9. The occulter petal unfurler of claim 1, wherein said petal length disposed between said petal root and said petal tip comprises 5 meters to 20 meters.

10. The occulter petal unfurler of claim 9, wherein said petal length disposed between said petal root and said petal tip is selected from the group consisting of: 5.5 meters to 6.5 meters, 6.0 meters to 7.0 meters, 6.5 meters to 7.5 meters, 7.0 meters to 8.0 meters, 7.5 meters to 8.5 meters, 8.0 meters to 9.0 meters, 8.5 meters to 9.5 meters, 9.0 meters to 10.0 meters, 9.5 meters to 10.5 meters, 10.0 meters to 11.0 meters, 10.5 meters to 11.5 meters, 11.0 meters to 12.0 meters, 11.5 meters to 12.5 meters, 12.0 meters to 13.0 meters, 12.5 meters to 13.5 meters, 13.0 meters to 14.0 meters, 13.5 meters to 14.5 meters, 14.0 meters to 15.0 meters, 14.5 meters to 15.5 meters, 15.0 meters to 16.0 meters, 15.5 meters to 16.5 meters, 16.0 meters to 17.0 meters, 16.5 meters to 17.5 meters, 17.0 meters to 18.0 meters, 17.5 meters to 18.5 meters, 18.0 meters to 19.0 meters, and 18.5 meters to 19.5 meters, or combinations thereof.

11. The occulter petal unfurler of claim 1, further comprising a journaled bearing assembly which rotatably joins said carousel to said spool said journaled bearing assembly including a first bearing component circumferentially coupled about a spool external surface and a second bearing component coupled proximate said annular member inner edge, at least a portion of said first bearing component rotatably engaged to at least a portion of said second bearing component to allow said carousel to rotate around said spool.

12. The occulter petal unfurler of claim 11, wherein said first bearing component has an inner annular journaled surface including a pair of annular ribs circumferentially coupled in substantially parallel outwardly extending relation about said spool external surface, wherein said second bearing component has an outer annular journaled surface including an annular flange rotatingly disposed about said spool between said pair of annular ribs.

13. The occulter petal unfurler of claim 12, further comprising a carousel drive assembly operable to rotate said carousel about said spool.

14. The occulter petal unfurler of claim 13, wherein said carousel drive assembly includes:
a drive motor coupled to said spool; and
a carousel drive element driven by said drive motor, said carousel drive element engaged to said carousel to rotate said carousel about said spool.

15. The occulter petal unfurler of claim 14, further comprising a circuitous member entrained about said annular flange of said carousel, said carousel drive element engaged to said circuitous member.

16. The occulter petal unfurler of claim 14, further comprising a first plurality of teeth coupled in spaced apart relation about a perimetrical face of said carousel drive element, a second plurality of teeth coupled in circumferentially spaced apart relation about said annular flange, said first plurality of teeth intermeshingly engagable to said second plurality of teeth.

17. The occulter petal unfurler of claim 14, wherein said carousel drive element comprises a rotatable member engaged to said carousel.

18. The occulter petal unfurler of claim 17, wherein said carousel drive element comprises said rotatable member engaged to said annular flange proximate an annular flange second edge.

* * * * *